(12) United States Patent
Olds et al.

(10) Patent No.: US 7,818,332 B2
(45) Date of Patent: Oct. 19, 2010

(54) QUERY SPELLER

(75) Inventors: Elliott K. Olds, Seattle, WA (US);
Gregory N. Hullender, Bellevue, WA (US); Haoyong Zhang, Redmond, WA (US); Janine R. Crumb, Seattle, WA (US); Jianfeng Gao, Kirkland, WA (US); Ming Zhou, Bejing (CN); Mu Li, Bejing (CN); Yajuan Lv, Bejing (CN)

(73) Assignee: Microsoft Corporation, Redmond, WA (US)

( * ) Notice: Subject to any disclaimer, the term of this patent is extended or adjusted under 35 U.S.C. 154(b) by 293 days.

(21) Appl. No.: 11/465,023

(22) Filed: Aug. 16, 2006

(65) Prior Publication Data

US 2008/0046405 A1 Feb. 21, 2008

(51) Int. Cl.
G06F 7/00 (2006.01)
G06F 17/30 (2006.01)

(52) U.S. Cl. ..................................... 707/759
(58) Field of Classification Search ............... 707/3, 707/5, 900.003, 759; 715/257
See application file for complete search history.

(56) References Cited

U.S. PATENT DOCUMENTS

| | | | |
|---|---|---|---|
| 4,490,811 A | 12/1984 | Yianilos | |
| 4,915,546 A | 4/1990 | Kobayashi | |
| 5,258,909 A | 11/1993 | Damerau | |
| 5,907,839 A | 5/1999 | Roth | |
| 5,956,739 A | 9/1999 | Golding | |
| 6,047,300 A | 4/2000 | Walfish | |
| 6,131,102 A | 10/2000 | Potter | |
| 6,144,958 A | 11/2000 | Ortega | |
| 6,424,983 B1 | 7/2002 | Schabes | |
| 6,848,080 B1 | 1/2005 | Lee | |
| 6,853,993 B2 | 2/2005 | Ortega | |
| 2003/0037077 A1* | 2/2003 | Brill et al. | ................... 707/533 |
| 2003/0145285 A1 | 7/2003 | Miyahira | |
| 2005/0210383 A1 | 9/2005 | Cucerzan | |
| 2005/0251744 A1 | 11/2005 | Brill | |

OTHER PUBLICATIONS

Philips, L. 1990. Hanging on the metaphone. Computer Language Magazine, vol. 7, No. 12, Dec. 1990, pp. 38-44.
James L. Peterson, "Computer Programs for Detecting and Correcting Spelling Errors". The University of Texas at Austin, 1980.
S. Cucerzan and E. Brill. "Spelling Correction As An Iterative Process That Exploits The Collective Knowledge Of Web Users". Redmond, WA. 1996.
E. Agirre, et al., "A Spelling Checker/Corrector for Basque Based on Two-Level Morphology". Donostia, Spain; 1989.
J. Gao, H. Qi, X. Xia and J. Nie, "Linear Discriminant Model for Information Retrieval", Microsoft Research, Asia, 2005.
Michael Collins, "Discriminative Training Methods for Hidden Markov Models: Theory and Experiments with Perceptron Algorithms", AT&T Labs-Research, New Jersey, 2002.

* cited by examiner

*Primary Examiner*—Yicun Wu
*Assistant Examiner*—Alexey Shmatov
(74) *Attorney, Agent, or Firm*—Joseph R. Kelly; Westman, Champlin & Kelly, P.A.

(57) ABSTRACT

Candidate suggestions for correcting misspelled query terms input into a search application are automatically generated. A score for each candidate suggestion can be generated using a first decoding pass and paths through the suggestions can be ranked in a second decoding pass. Candidate suggestions can be generated based on typographical errors, phonetic mistakes and/or compounding mistakes. Furthermore, a ranking model can be developed to rank candidate suggestions to be presented to a user.

16 Claims, 5 Drawing Sheets

QUERY SPELLER

BACKGROUND

Current search based applications receive a query from a user and provide a plurality of results based on the query. In a web search engine, the results include a plurality of links to documents on the Internet. In some instances, a user may issue a query that is misspelled. In this case, the web search engine may provide the user with a suggestion for spelling the query along with the results.

The discussion above is merely provided for general background information and is not intended to be used as an aid in determining the scope of the claimed subject matter.

SUMMARY

Candidate suggestions for correcting misspelled query terms input into a search application are automatically generated. A score for each candidate suggestion can be generated using a first decoding pass and paths through the suggestions can be ranked in a second decoding pass. Candidate suggestions can be generated based on typographical errors, phonetic mistakes and/or compounding mistakes. Furthermore, a ranking model can be developed to rank candidate suggestions to be presented to a user.

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
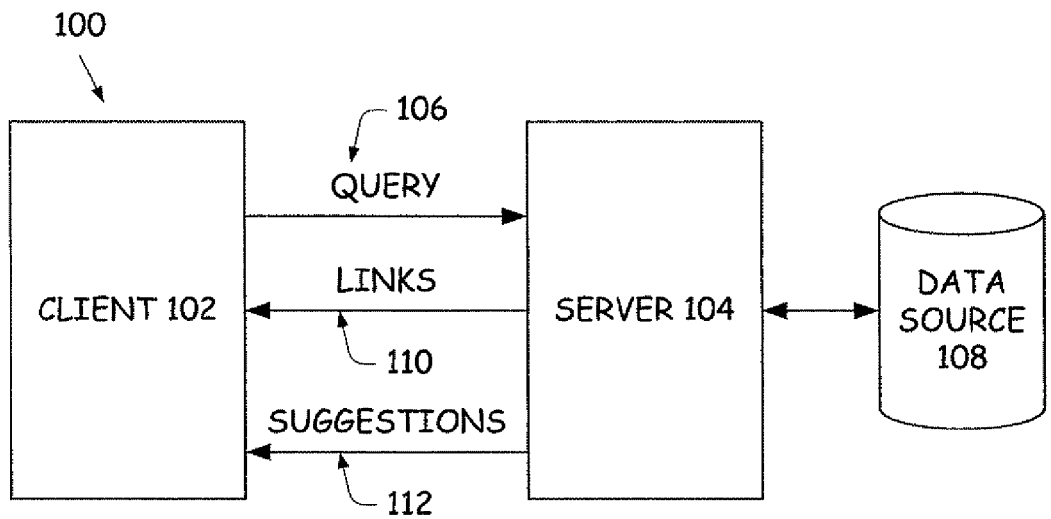
FIG. 1 is a block diagram of a web search environment.

FIG. 1 is a block diagram of an exemplary web search environment 100. Environment 100 includes a client 102 and a server 104. A user operates client 102 to issue a query 106 to server 104. Server 104 accesses data source 108, which may be information stored in a local data store or across a network such as the Internet. In response to query 106, server 104 generates a plurality of links 110 based on data source 108 and is capable of providing one or more suggestions 112 for spelling query 106. If desired, the number of suggestions 112 can be limited so as to preserve space on an interface for rendering links 110. For example, one or none of suggestions 112 can be displayed.

Frequently occurring spelling errors of user queries include typographical errors, phonetic mistakes and/or compounding mistakes. Typographical errors refer to insertions, deletions, substitutions and/or transpositions of letters that lead to invalid words that are not recognized by server 104 or stored in a pre-defined trusted lexicon such as a dictionary, collection of proper names, collection of recognized names, etc. For example, a typographical error can be included in the query "examplw", when the desired query was actually "example". Phonetic mistakes refer to invalid words that are a result from a phonetic confusion (such as "f" and "ph"). These phonetic confusions can contain character strings having different lengths and thus are not easily classified as typographical errors. Phonetic mistakes occur when the user has misspelled a query based on a phonetic sound of the query, wherein "eggsample" and "example" have similar phonetic sounds as well as "telefone" and "telephone".

Compounding mistakes result from missing spaces, wherein queries do not contain word boundaries. For example, a user may use a universal resource locator (URL) as a query. In this instance, a user may issue the query www krispykream.com where "krispykream" should be segmented as "krispy kream". Furthermore, there can be ambiguities in detecting word boundaries, e.g. "bathandbeyond" can be "bat hand beyond" or "bath and beyond".

Server 104 can provide query spelling suggestions 112 based on a statistical decision. For example, given an input query q, which may contain errors, server 104 can find a suggestion t* with the best score among all possible corrections (defined as set GEN(q)) by maximizing a ranking function with a parameter λ and a score (t, q, λ) Correction t* can be expressed as:

$$t^* = \arg\max_{t \in GEN(q)} Score(t, q, \lambda)$$

Figure 2:
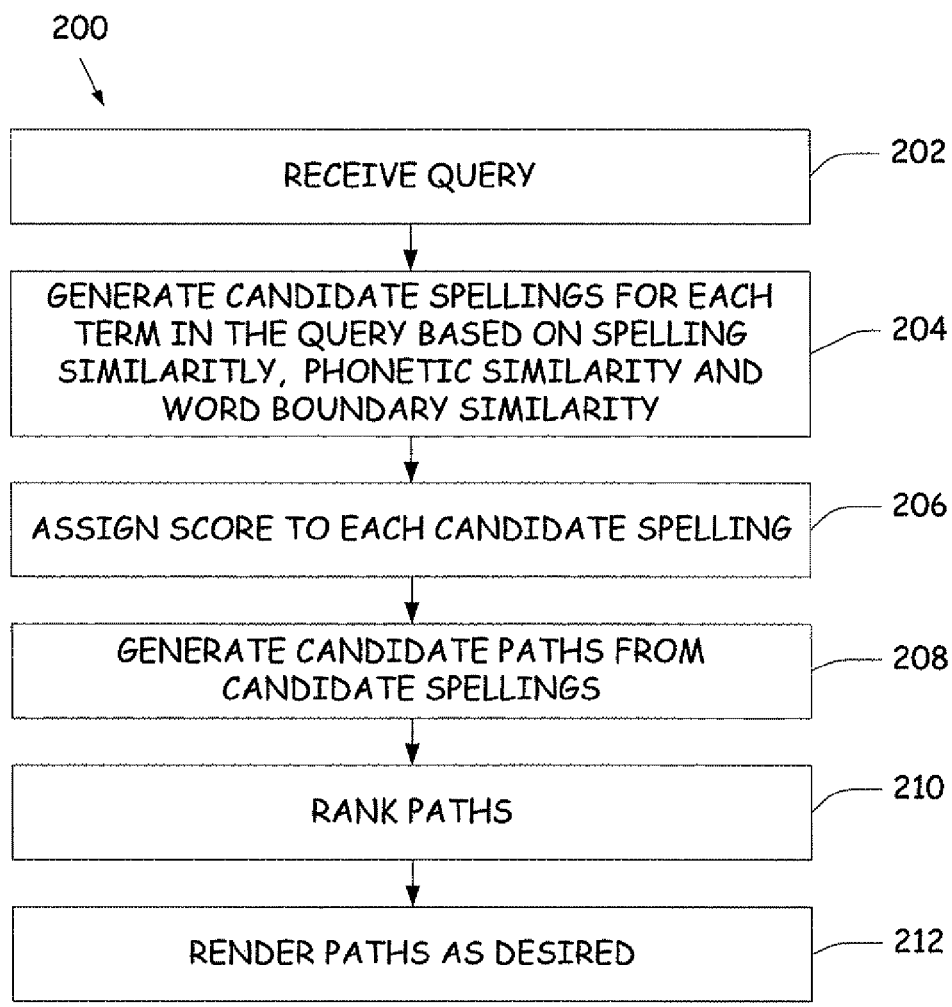
FIG. 2 is a flow chart of a method for generating candidates spelling suggestions from an input query.

FIG. 2 is a flow chart of a method for generating candidate spelling suggestions from an input query. Method 200 begins at step 202 wherein the query is received. At step 204, candidate spellings for each term in the query are generated based on spelling similarity, phonetic similarity and word boundary similarity of corresponding terms in a lexicon. For example, the query may include the term "Microsoftt", which is similar to the term "Microsoft" in the lexicon. At step 206, scores are assigned to each of the candidate spellings. In one example, the score can correspond to the similarities identified with regard to spelling, phonetics and word boundaries.

Candidate paths are generated for the candidate spellings at step 208. A candidate path includes a candidate spelling suggestion for each term in the query. The paths are ranked based on a ranking algorithm. At step 212, a selected number of paths are then rendered as desired. For example, one or none of the paths can be rendered. If it is likely that query 106 does not contain misspellings, none of the suggestions are rendered.

Figure 3:
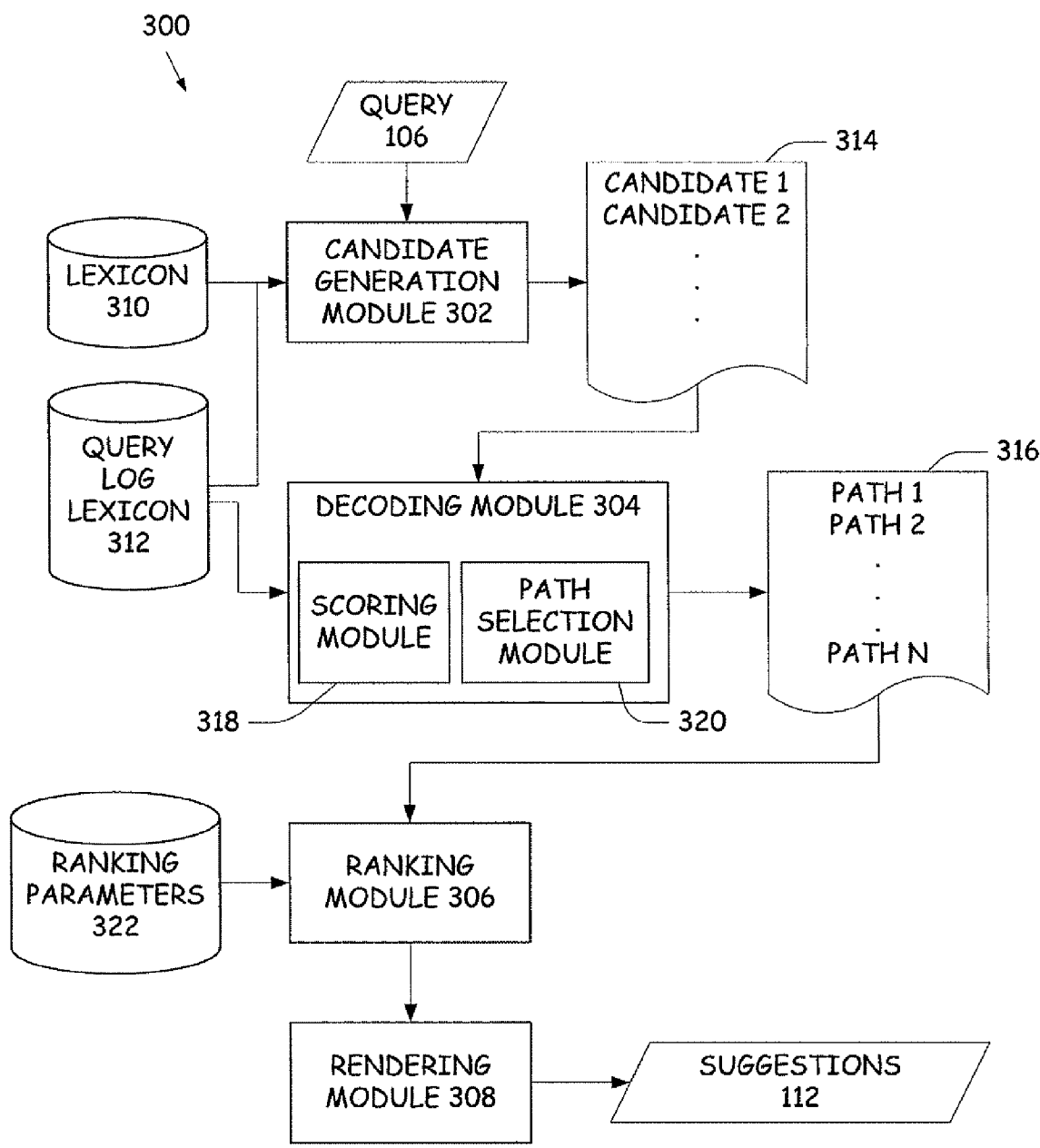
FIG. 3 is a block diagram of a system for generating candidates spelling suggestions from an input query.

FIG. 3 is a block diagram of a system 300 for generating suggestions 112 from query 106 as discussed with respect to method 200 in FIG. 2. System 300 includes a candidate generation module 302, a decoding module 304, a ranking module 306 and a rendering module 308. Candidate generation module 302 accesses lexicon 310 and query log lexicon 312 to generate a candidate list 314 of candidate spellings for each term in query 106. Lexicon 310 includes terms that are recognized, such as terms in a dictionary, proper names, etc. If desired, lexicon 310 can be a domain specific lexicon such as a lexicon containing medical terms or legal terms. In a domain independent scenario, lexicon 310 can be a web-based lexicon that includes terms appearing on web pages along with an indication of frequency of appearance. For example, the web-based lexicon could include the term "znake", which refers to a video game that is searched for on the Internet. Query log lexicon 312 includes terms and/or phrases used in previous queries and an indication of frequency that the terms and/or phrases have been used. The indication of frequency can be useful in generating candidate spellings and/or ranking candidate spellings.

The candidate list 314 can be generated based on typographical errors, phonetic mistakes and/or compounding mistakes. Additionally, the indications of frequency in query log lexicon 312 can be used to generate list 314. Candidates from typographical errors can be based on similarities in letters between query 106 and terms in lexicon 310 and/or query log lexicon 312. One example measure of similarity is referred to as Edit Distance (ED), which can be used to estimate similarity between two strings, for example a string in query 106 and a string in lexicon 310 and/or lexicon 312. For example, candidates can include all words in lexicon 310 and/or lexicon 312 having an edit distance below a threshold. If desired, a weighted edit distance function can be used wherein costs for edit operations can be different depending on relative positions of keys on a keyboard. In one embodiment, lexicon 310 and/or lexicon 312 can be stored in an ordered data structure known as a "trie". A trie includes a plurality of nodes in a hierarchical structure organized in a parent/child relationship, wherein children nodes that descend from a common parent node share a common prefix.

To generate candidates based on phonetic similarity, phonetic encoding can be used. One example phonetic encoding algorithm is referred to as metaphone, which codes words phonetically to consonant sounds. For example, one metaphone algorithm phonetically reduces English words to sixteen (16) consonant sounds while another metaphone algorithm, referred to as double metaphone, phonetically reduces English words to twelve (12) consonant sounds. Strings with similar or identical coding can be indicative of a phonetic mistake in query 106, for example, both "schwarzenegger" and "shuaraseneger" are mapped to "SRSNGR".

Furthermore, these encodings can be extended to take into account surface letters of both the query 106 and terms in lexicon 310 and/or lexicon 312. For example, given a misspelled word "dctoniry", a corresponding phonetic encoding could be "TKTNR". The correct word "dictionary", which can be encoded as "TKXNR", does not have an identical encoding. Phonetically encoded strings can thus also include an associated surface letter, wherein "dctoniry" can be encoded as "T:D K:C T:T N:N R:R" and "dictionary" can be encoded as "T:D K:C X:T N:N R:R". When comparing a query term to a term in lexicon 310 and/or lexicon 312, both the phonetic encoding and surface letters can be compared. If either letters in the phonetic encoding or surface letters match, a successful comparison results and the respective term in lexicon 310 or lexicon 312 can be added to list 314.

Compounding mistakes can be identified by defining c as an unsegmented query, which is a character string. Furthermore, $q=q_1, q_2 \ldots q_n$ as a segmented query term string. In developing a word boundary, a most likely query term sequence q* among all possible candidates into which c can be segmented is desired. The most likely sequence q* can be expressed as:

$$q^* = \arg\max_{q \in GEN(c)} P(q|c) = \arg\max_{q \in GEN(c)} P(q)P(c|q)$$

P(c|q) can be referred to as an error model and can be set to be approximately proportional to an edit distance if some segmented query terms are unknown words with edit distances lower than a pre-set threshold. In the query "krispykcream", the string "kcream" could be spelled as "kreme". P(c|q) could be adjusted to reflect this situation. Alternatively, P(c|q) can be set equal to one, wherein only the query term sequence P(q) is computed to define word boundaries. One example computation of P(q) can use a Markov chain having a trigram model assumption (i.e. a next query term is dependent on its two preceding terms). Thus, P(q) can be expressed as:

$$P(q) = P(q_1) \prod_{i=2\ldots n} P(q_i|q_1 \ldots q_{i-1}) \approx P(q_1) P(q_2|q_1) \prod_{i=3\ldots n} P(q_i|q_{i-2} q_{i-1}).$$

Figure 4:
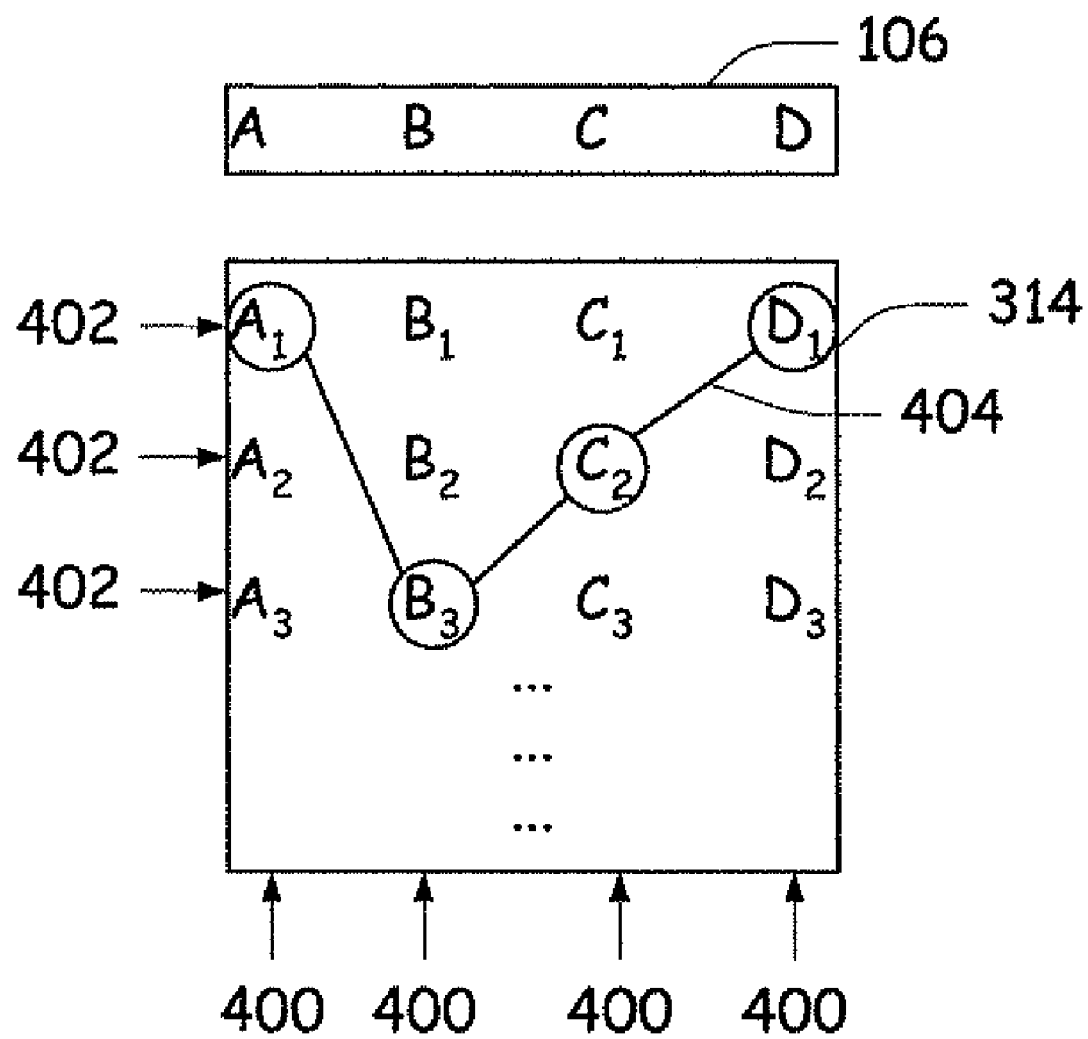
FIG. 4 is a diagram of a query and a list organized in a lattice.

List 314 can be constructed as a lattice of columns and rows where columns of the lattice include candidates for each term in query 106. Candidate spellings can merge two adjacent terms in a query into a single term. For example, for terms "micro" and "soft", a candidate spelling for both terms could be "Microsoft". FIG. 4 is a block diagram of query 106 and list 314. List 314 is constructed as a lattice having a plurality of columns 400 and a plurality of rows 402. Query 106 includes terms A, B, C and D. Lattice 314 includes four columns of candidates for each of the four terms, i.e. "$A_1, A_2, A_3, \ldots$", "$B_1, B_2, B_3 \ldots$", "$C_1, C_2, C_3, \ldots$" and "$D_1, D_2, D_3, \ldots$". A path through the lattice can contain a term from each column. For example, path 404 includes candidates $A_1$, $B_3$, $C_2$ and $D_1$.

Decoding module 304 extracts paths from list 314 to develop an N-best list of paths 316. Decoding module 304 uses a scoring module 318 and a path selection module 320 to generate list 316. Scoring module 318 assigns a score to each term in list 314. For example, scoring module assigns a score for $A_1, A_2, A_3, B_1, B_2 \ldots$, etc. In one instance, scoring module 318 can use a time-synchronous Viterbi search algorithm, which assigns scores to candidates in a sequential manner. The scores can be assigned based on spelling similarity, phonetic similarity and/or word boundary similarity to terms in lexicon 310 and/or lexicon 312. Alternatively, or in addition, scores can be assigned based on a frequency of a term and/or phrase that appears in lexicon 310 and/or lexicon 312. For example, if a frequency of "Microsoft" is higher in lexicons 310 and/or 312 than a frequency of "micro soft", "Microsoft" will receive a higher score. The frequency score can be extended to phrases having more than one term. For example, if a frequency for "Britney Spears" is great than a frequency for "Brittany Spears", the phrase "Britney Spears" will receive a higher score. To reduce processing time for scoring module 318, scores can be assigned locally without relation to other terms in query 106.

Path selection module 320 uses scores from scoring module 318 to select list 316 of N-best paths. In one example, path selection module 320 can be a stack decoder that utilizes what is referred to as the A* search algorithm. The A* search algorithm finds paths in list 314 based on a "heuristic estimate". The heuristic estimate used is the scores for candidate terms in list 314 assigned by scoring module 318. Additionally, path selection module 320 can identify relationships among terms in paths of list 314 to generate N-best list 316. For example, a relationship between "Ford" and "explorer" is more likely than a relationship between "food" and "explorer". Path selection module 320 uses a relationship among terms in a query as a feature in generating list 316.

Paths in n-best list 316 are ranked by ranking module 306. In one example, a linear discriminative model (LDM) is used within ranking module 306. In this model, a set of N ranking features $f_i(q, t)$ is used, for $i=1, \ldots, N$, where q is a query and t is a correction for query q. The features are represented as functions that map (q, t) to real values (or binary values). Ranking module 306 uses ranking parameters 322 to rank paths 316. Ranking parameters 322 corresponding to weights for each feature function. Parameters are represented as $\lambda$. A ranking score of t provided by ranking module 306 with respect to a given query q can be expressed as:

$$\text{Score}(q, t, \lambda) = \lambda f(q, t) = \sum_{i=1}^{N} \lambda_i f_i(q, t)$$

Rendering module 308 uses the scores provided by ranking module 306 to decide how many suggestions to render. Depending on the scores, rendering module 308 can render zero, one or more of the paths as suggestions 112. For example, for the query "Microsoftt", a suggestion could be "Microsoft", for the query "Food explorer", the suggestion could be "Ford explorer" and for the query "Brittany Spears", the suggestion could be "Britney Spears".

Figure 5:
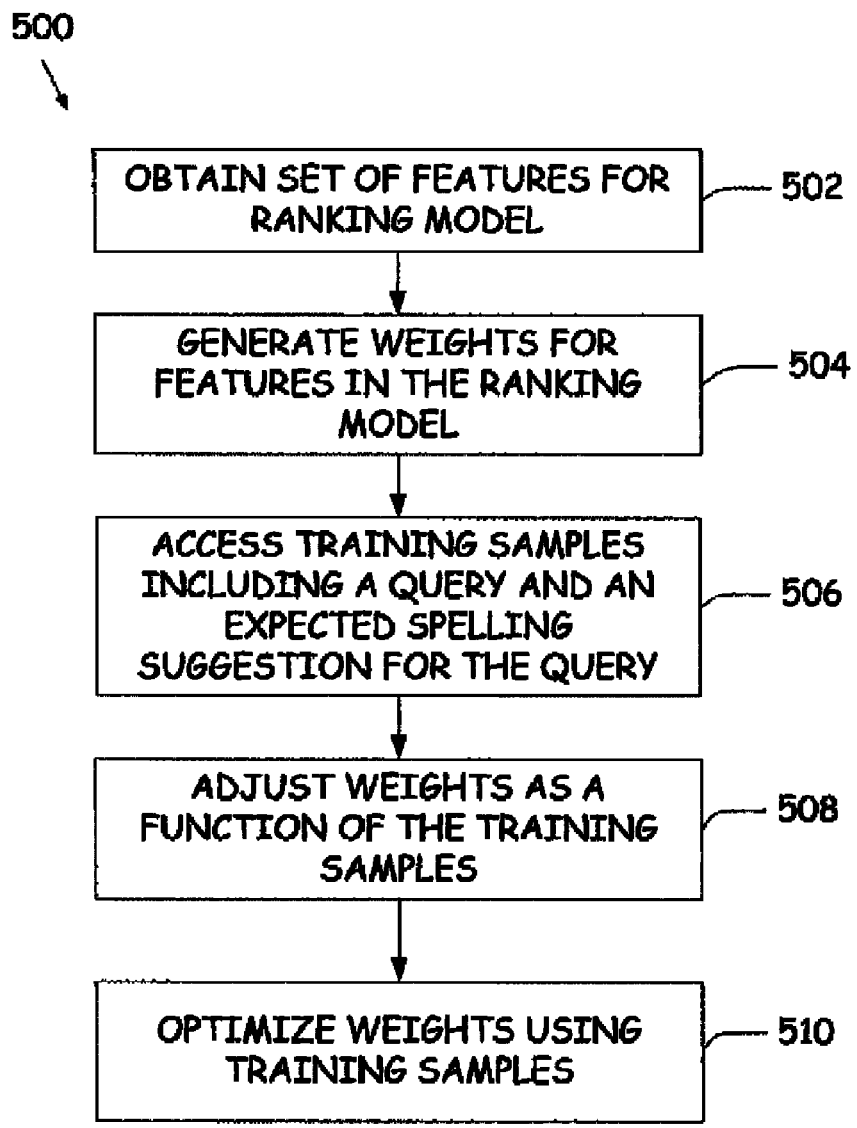
FIG. 5 is a flow chart of a method for developing a ranking model.
Figure 6:
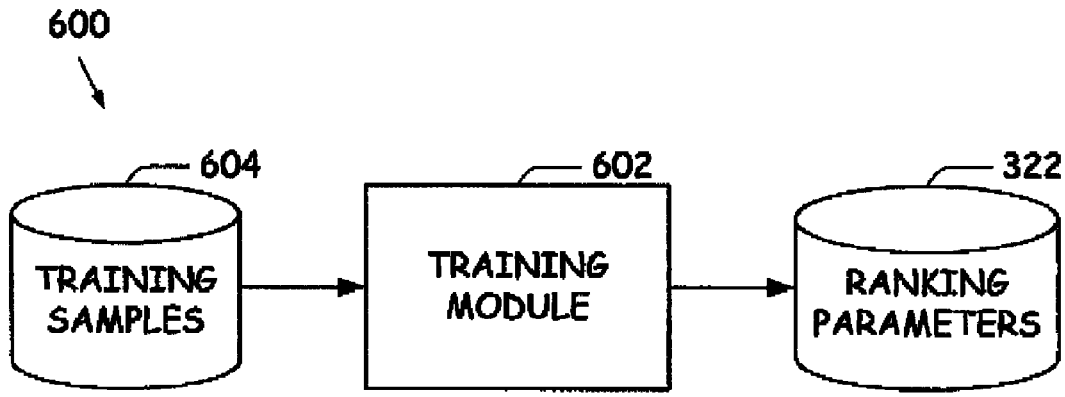
FIG. 6 is a block diagram of a environment for training a ranking model.

FIG. 5 is a flow chart of a method 500 for training ranking module 306 and FIG. 6 provides an environment 600 for adjusting ranking parameters 322 used by ranking module 306. At step 502, a set of features for a ranking model used by ranking module 306 is obtained. Below is a list of exemplary features for the ranking model used by ranking module 306. The features can be identified based on words in the query, relationships among words in the query and/or relationships among words in the query and words in candidate paths.

Features

1—A score based on a frequency in query log lexicon 312 and/or on the web of words in the query.

2—Whether a ratio of a frequency of a phrase in a candidate path to a frequency of a corresponding phrase in the query is greater than some constant value. For instance if the frequency of a query phrase "pizzza hut" was 10 and the frequency of a candidate phrase "pizza hut" was 200, the ratio being considered would be 200/10=20, which would be compared to the constant value.

3—Is a word in the query a word not found in a dictionary?

4—Is a word in the query a word not found in a dictionary, AND is a distance between that word and a corresponding word in lexicon 310 and/or query log lexicon 312 greater than a value?

5—Is a word in the query a word found in a dictionary?

6—Is the length of a word in the query less than some value?

7—Is more than a specified number of characters missing in the query when compared to a candidate path word AND is a length of the query word less than a specified value?

8—Is an edit distance between a query word and a candidate path word less than some value?

9—Did the length of a query word change when compared to a candidate word?

10—Are the query words and candidate words the same aside from spacing?

11—When comparing a query word and a candidate path word, was the query word split into several pieces, AND the frequency of the several pieces in lexicon 310 and/or lexicon 312 is significantly greater than some value?

12—Is the frequency in lexicon 310 and/or 312 of a bigram (for example two adjacent letters or words) in the query less than some value?

13—Is the length of some word in the query less than some value?

14—Is the frequency in lexicon 310 and/or 312 of a unigram (one character or word) in the query greater than some value?

15—Is a candidate word found in a dictionary?

16—Is phonetic similarity between a query word and a candidate path word greater than some threshold?

17—Is the ratio of frequencies in lexicon 310 and/or lexicon 312 between a query word and the candidate path word greater than some value?

18—Was a query word split into multiple words AND its length is greater than a value?

19—Is the query word the same as the candidate path word?

20—A measure of the phonetic similarity between a query word and a candidate path word.

21—Is the candidate path the same as the query?

22—How many web results were obtained for the query?

23—A measure of word similarity done by splitting words into sequences of two characters (i.e. "characters" would yield "ch", "ha", "ar", "ra", "ac", "ct", "te", "er", "rs"), and comparing how many of these the query word and the candidate path words have in common.

24—When comparing the query and the candidate path, was a proper noun changed?

25—Does the query contain what appears to be two names in a row (first then last, or last then first)?

26—Does a word in the query match a word in the title of a web result?

27—Has an apostrophe been added/removed from a query when compared to a candidate path word?

28—Has the number of words changed when comparing a query word and a candidate path word?

At step 504, weights for features in the ranking model are generated. These weights can be arbitrarily set and are used by training module 602 to establish weights that are optimized. At step 506, training samples 604 are accessed by training module 602 that include a query and an expected spelling suggestion for the query. Weights are adjusted as a function of the training samples at step 508. In one example, a perceptron algorithm is used to learn weights of ranking parameters 322 of the ranking model. The perceptron algorithm is an on-line and error-correcting training procedure. The algorithm starts with an initial ranking parameter setting and adapts the setting each time a query in the training set is corrected wrongly using the current parameter setting.

For example, if q is a misspelled query and t is a correction for q from the training samples 604, the ranking model will be evaluated by training module 602 to see if t is suggested given q. If t has a higher score based on the ranking model, t is suggested, and otherwise q is suggested. If t is not suggested, ranking parameters 322 are adjusted.

Once the perceptron algorithm has completed, weights can then be optimized by further processing at step 510. During optimization, training module 602 evaluates all training samples 604 to see how many samples were evaluated correctly. Then, a single parameter of ranking parameters 322 can be adjusted and all the samples 604 can be evaluated again to see if the number correct improved. If the number improved, the change is kept, otherwise the change is discarded. This process can be repeated for every feature, one at a time, over and over until no improvements are found for a full iteration through all of the features.

The perceptron algorithm is proved to be robust and guaranteed to converge when training samples are separable (i.e., there is an ideal parameter setting which leads to a ranking model that can achieve zero error). However, such an ideal parameter setting is difficult to obtain with regard to spelling corrections. The perceptron algorithm in this case could be unstable. To account for this possibility, different methods can be used.

One method includes a variant of the perceptron algorithm called the averaged perceptron algorithm. In this method, ranking parameters 322 can be averaged over a course of many iterations. In another method, a number of updates for each training sample can be counted. If the number is larger than a preset threshold (meaning that the sample cannot be correctly ordered after many trails and is likely to be a noisy sample), the sample can be removed from the samples for training in subsequent iterations.

Figure 7:
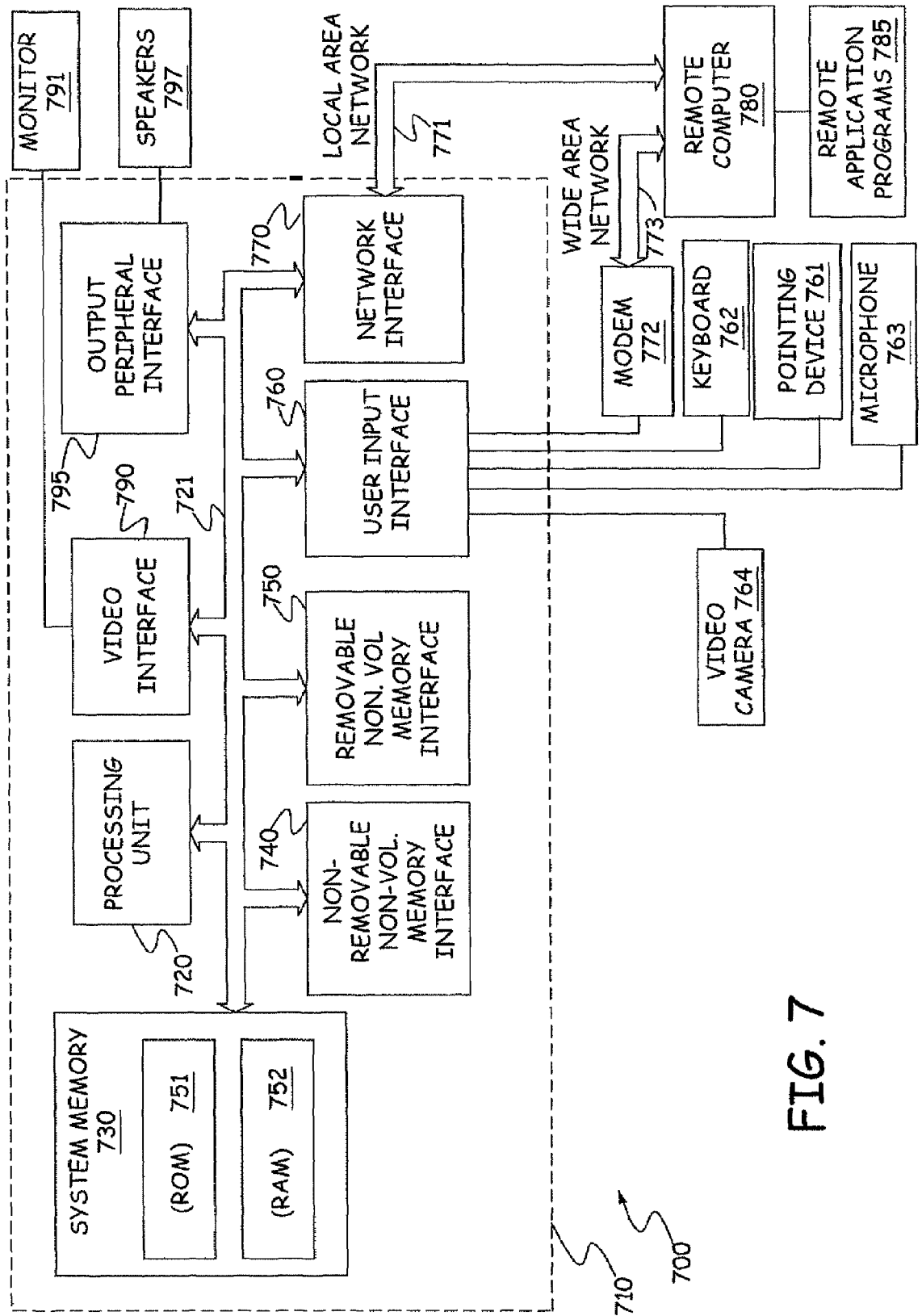
FIG. 7 is a block diagram of a general computing environment.

Concepts presented above can be embodied in a suitable general computing environment. The computing environment shown in FIG. 7 is one such example that can be used as client 102 and/or server 104. Additionally, the environment can be used to implement method 200, system 300, method 500 and/or system 600.

In FIG. 7, the computing system environment 700 is only one example of a suitable computing environment and is not intended to suggest any limitation as to the scope of use or functionality of the claimed subject matter. Neither should the computing environment 700 be interpreted as having any dependency or requirement relating to any one or combination of components illustrated in the exemplary computing environment 700.

Computing environment 700 illustrates a general purpose computing system environment or configuration. Examples of well-known computing systems, environments, and/or configurations that may be suitable for use with the concepts presented above include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Concepts presented above may be described in the general context of computer-executable instructions, such as program modules, being executed by a computer. Generally, program modules include routines, programs, objects, components, data structures, etc. that perform particular tasks or implement particular abstract data types. These modules include candidate generation module 302, decoding module 304, ranking module 306, rendering module 308, scoring module 318, path selection module 320 and training module 602. As discussed above, these modules can be utilized to implement method 200 and/or method 500. Some embodiments are designed to be practiced in distributed computing environments where tasks are performed by remote processing devices that are linked through a communications network. In a distributed computing environment, program modules are located in both local and remote computer storage media including memory storage devices.

Exemplary environment 700 for implementing the above embodiments includes a general-purpose computing system or device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data.

The system memory 730 includes computer storage media in the form of volatile and/or nonvolatile memory such as read only memory (ROM) 731 and random access memory (RAM) 732. The computer 710 may also include other removable/non-removable volatile/nonvolatile computer storage media. Non-removable non-volatile storage media are typically connected to the system bus 721 through a non-removable memory interface such as interface 740. Removable non-volatile storage media are typically connected to the system bus 721 by a removable memory interface, such as interface 750.

A user may enter commands and information into the computer 710 through input devices such as a keyboard 762, a microphone 763, a pointing device 761, such as a mouse, trackball or touch pad, and a video camera 764. For example, a user may enter query 106 through these input devices. These and other input devices are often connected to the processing unit 720 through a user input interface 760 that is coupled to the system bus, but may be connected by other interface and bus structures, such as a parallel port or a universal serial bus (USB). A monitor 791 or other type of display device is also connected to the system bus 721 via an interface, such as a video interface 790. Monitor 721 can be used to render links 110 and suggestions 112 to a user. In addition to the monitor, computer 710 may also include other peripheral output devices such as speakers 797, which may be connected through an output peripheral interface 795.

The computer 710, can be operated in a networked environment using logical connections to one or more remote computers, such as a remote computer 780. The remote computer 780 may be a personal computer, a hand-held device, a server, a router, a network PC, a peer device or other common network node, and typically includes many or all of the elements described above relative to the computer 710. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on remote computer 780. It will be appreciated that the network connections shown are exemplary and other means of establishing a communications link between computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a computer with a processor, comprising:
   receiving a search query containing a representation of a text string having a plurality of search terms and identifying the search terms as being separated by spaces;
   accessing, with the processor, a lexicon of terms stored in a memory;
   generating, with the processor, a plurality of candidate spellings for each search term in the query based on a spelling similarity, a phonetic similarity, and a word boundary similarity, between the search terms and the terms in the lexicon, and organizing the candidate spellings in a structure to group candidate spellings for each search term;
   assigning a score to each of the candidate spellings based on the spelling similarity, the phonetic similarity and the word boundary similarity;
   generating, with the processor, a plurality of candidate query paths through the structure based on the scores that were previously assigned for each candidate spelling, each candidate query path containing a candidate spelling for each search term in the search query;
   determining, with the processor, a relationship among the candidate spellings in each candidate query path; and
   ranking, with a ranking model, the candidate query paths as a function of the scores of each candidate spelling and the relationship, the ranking model being generated by obtaining a set of feature functions for the ranking model that ranks candidate query paths of suggested spelling corrections given a search query;
   generating, with the processor, a weight for each feature function in the set of feature functions to create weighted ranking parameters for the ranking model;
   accessing, with a processor, a plurality of samples, each sample having a query and an expected spelling suggestion for the query;
   employing the ranking model to rank candidate paths generated for each query; and
   adjusting the weights for the weighted ranking parameters based on the ranking applied to the candidate paths for the plurality of samples.

2. The method of claim 1 wherein the spelling similarity comprises a measure of edit distance between a term in the search query and a term in a lexicon.

3. The method of claim 2 wherein assigning a score is performed as a function of edit distance, phonetic similarity and word boundary similarity.

4. The method of claim 3 wherein each score is used as an estimate to generate the candidate query paths.

5. The method of claim 1 and further comprising:
   identifying features in the search query and wherein ranking the candidate query paths is performed as a function of the features identified in the search query.

6. The method of claim 1 wherein the candidate spellings are generated based on terms in a lexicon.

7. The method of claim 1 wherein the phonetic similarity is computed as a function of phonetic encoding of the search query and terms in the lexicon.

8. The method of claim 1 wherein the phonetic similarity is further computed as a difference between surface letters in the search query and surface letters of terms in the lexicon.

9. The method of claim 1 and further comprising:
   identifying features in the search query and wherein ranking the candidates spellings is further performed as a function of the features.

10. The method of claim 1 and further comprising:
    determining a score for each query and each expected spelling suggestion for the query in the plurality of samples based on the feature functions;
    comparing the score for the query and the score for the expected spelling suggestion for each of the plurality of samples; and
    adjusting the weights as a function of the comparison of the scores for the query and the scores for the expected spelling suggestions in each of the plurality of samples.

11. The method of claim 1 wherein at least one feature function relates to a frequency of a query term appearing in a lexicon.

12. The method of claim 1 wherein at least one feature function relates to a length of a query term.

13. The method of claim 1 wherein at least one feature function relates to a relationship between two terms in the query.

14. The method of claim 1 wherein at least one feature function relates to an edit distance measure of similarity between a query term and a term in an expected spelling suggestion.

15. The method of claim 1 wherein the feature functions relate to a phonetic similarity of a query term and a term in an expected spelling suggestion.

16. The method of claim 1 wherein the feature functions relate to a word boundary similarity of a query term and a term in an expected spelling suggestion.

\* \* \* \* \*

UNITED STATES PATENT AND TRADEMARK OFFICE
CERTIFICATE OF CORRECTION

PATENT NO. : 7,818,332 B2
APPLICATION NO. : 11/465023
DATED : October 19, 2010
INVENTOR(S) : Elliot K. Olds et al.

It is certified that error appears in the above-identified patent and that said Letters Patent is hereby corrected as shown below:

In Face page, in field (75), under "Inventors" column 1, line 1, delete "Elliott K. Olds," and insert -- Elliot K. Olds, --, therefor.

Signed and Sealed this
Eighth Day of March, 2011

David J. Kappos
*Director of the United States Patent and Trademark Office*